Feb. 24, 1959  A. O. HARMON  2,874,490
LAND LEVELER
Filed July 21, 1954

INVENTOR.
ALTON O. HARMON
BY Norman L. Wilson Jr.
his ATTORNEY

United States Patent Office 2,874,490
Patented Feb. 24, 1959

2,874,490
LAND LEVELER

Alton O. Harmon, Marked Tree, Ark., assignor to St. Francis Valley Farms Co., a corporation of Arkansas Application July 21, 1954, Serial No. 444,777

3 Claims. (Cl. 37—169)

This invention relates to soil moving devices particularly to land levelers of the ground scraping type provided with a soil-moving element adapted to be used in leveling and irrigating purposes.

The land leveling device of this invention is especially adapted for filling pot-holes and for surface re-leveling. The Mississippi delta is characterized by the presence of small holes from eight to twelve feet in diameter and from six to eighteen inches deep caused by over-flows of past years. In addition after crops which require irrigation, for example rice, are raised, there are always holes caused by running ground water. Each year these fields must be re-leveled and water diversion dikes smoothed out. The land leveling machine with which this invention is concerned is very fast and efficient for such use. The ground leveling implement of the character herein contemplated can also desirably be used to smooth or finish the grade on a field which has been shaped with a presently available commercial land plane. These machines are only twelve feet wide and do a rough finish job.

In accordance with this invention a land leveler is provided characterized by its mobility, economy of manufacture, ease of operation and simplicity of construction. A frame structure carries a soil-moving element which assumes attitudes during earth traversing movement generally averaging the slope of the ground. The frame structure is provided with land traction means at its trailing end permitting the frame structure to remain substantially horizontal during operation. Resting on the frame structure is a soil moving element carrying member which is pivotally joined at its midpoint to the frame structure. A soil-moving element is carried by the pivotally movable carrying member. A draw bar is flexibly connected to this soil-moving element and the other end to a towing vehicle, for example a tractor. The end of the draw bar connected to the tractor also supports the leading edge of the frame structure. The soil-moving element is adapted automatically for vertical pivotal movement about its midpoint and manually for horizontal movement about its midpoint.

Further features of my invention will become more apparent to those skilled in the art upon consideration of the accompanying drawings and the description in conjunction therewith.

An exemplary embodiment of the invention is disclosed with the understanding, of course, that variations and changes are possible within the scope of the invention.

Figure 1:
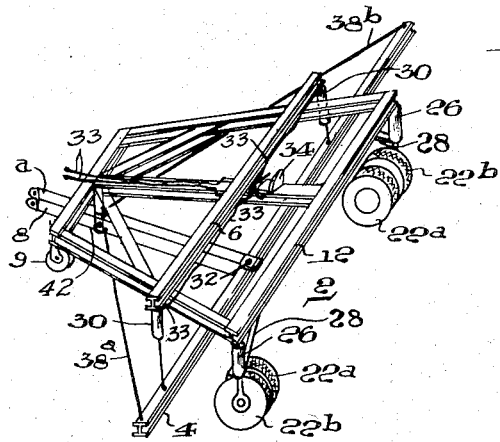
Figure 1 is a view in perspective showing a device constructed according to an embodiment of my invention.

Referring first to Figure 1, which shows a preferred form of the land leveling device, it will be noted that the land leveling machine of this invention comprises a supporting frame 2, a scraping element 4, a scraping element carrying member 6 and a draw bar 8.

Figure 2:
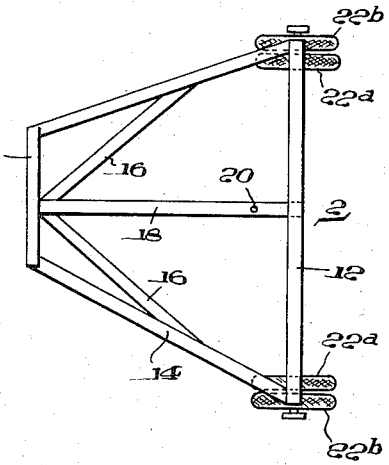
Figure 2 is a top plan view of the leveler frame.
Figure 3:
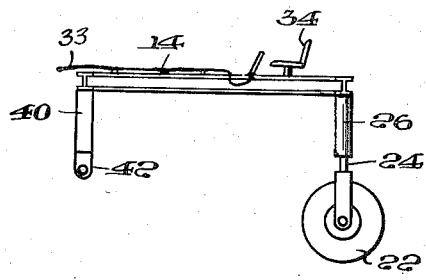
Figure 3 is a side elevation thereof.

The leveler frame 2, shown more clearly in Figures 2 and 3, is a transversely extending quadrilateral frame including substantially parallel front and rear frame beams or bars 10 and 12 respectively, and side beams 14. The leveler frame is substantially horizontal and preferably trapezoidal in shape as shown in Figures 1 and 2. The frame is reinforced by two brace bars 16 and also by a rigid center brace 18 connected to the front and back members 10 and 12, shown best in Figure 2. The center brace also provides a pivotal connection at point 20 for the scraping element carrying member which it supports as will be more fully described hereinafter.

The rear end of supporting frame 2 is provided with wheels 22 and connecting means 24 and 26 for attaching the wheels to the supporting frame, whereby the rear end of the frame is elevated. An advantage of the land leveler provided in accordance with this invention is its mobility and ease of handling. This results in part from the novel wheel connecting means of this invention. According to this embodiment of the invention swivel wheels are employed. As shown in Fig. 2 two wheels 22a and 22b are provided on a common axle connected to the frame through a cylinder or pipe within a larger cylinder or pipe connected to the underside of back frame member 12. A single wheel may be used in place of the double wheels 22a and 22b, if desired. As shown in Figure 3 the axle is journaled to a rod or pipe 24 which is slidable within a cylinder or pipe 26 of slightly larger diameter. If desired instead of pipe 26 a cylinder can be used with compressed air within the cylinder or pipe. In addition reinforcing braces 28 can be used if desired.

Figure 4:
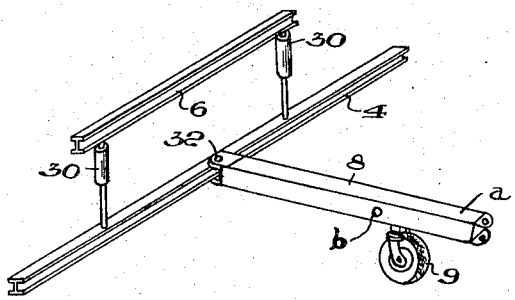
Figure 4 is a perspective view of the scraping element, shown in conjunction with its supporting member.

The leveler frame serves as a supporting structure for the scraping element. Resting on supporting frame 2 is scraping element carrying element 6. The scraping element carrying member is pivoted at its midpoint to center brace 18 (Fig. 2), at point 20. This pivotal connection provides for rotation of the carrying member in either direction about its midpoint. In Figure 4 is illustrated the scraping element carrying member 6 and the scraping element 4 carried thereby. The carrying member 6 and the scraping element 4 are so disposed that the midpoint of the scraping element 4 is in vertical alignment with the midpoint of its carrying member 6 so that the two can be maintained in the same plane as each pivots relative to its midpoint. As shown in Figures 1 and 4 scraping element carrying member 6 and scraping element itself 4 are connected to each other through hydraulic jacks 30. A hydraulic jack 30 is rigidly secured to the underside of scraping element carrying member 6 at each end thereof and is operatively connected to scraping element 4 below. The two jacks 30 can be hydraulic cylinders provided with two-way valves each hydraulic cylinder adapted separately to raise and lower its particular end of scraping element 4. The cylinders 30 include oil or other fluid inlet and outlet ports in communication as by a hose 33 with the usual control valve and pressure pump on the tractor (not shown).

The hydraulic control system provided in combination with this invention can be operated from controls that are standard equipment on all tractors, or, if the ground is too rough and the tractor driver cannot devote enough of his time to the operation of the scraping element, a man on the drag can operate the hydraulic system from a set of controls on the leveler at 34. Two man operation is preferred because a man sitting on the leveler can better see the holes. Obviously, of course, the extra man increases the cost of operation.

The leveler frame 2, and the scraping element 4, are connected to a tractor or similar towing means through a draw bar 8. One end (a) of draw bar 8 is adapted for attachment to the tractor or the like while the opposite end of the draw bar is in pivotal connection with the scraping element 4, as by a clevis 32 which permits horizontal pivotal movement of the scraping element relative to the draw bar, said horizontal pivotal movement being restricted in each direction by the wheels of the rear of the frame. (See Fig. 1).

Thus draw bar 8 is connected at one end (*a*) to, say, a tractor, and at its opposite end to the scraping element. In addition the draw bar supports or carries the front end of the frame as shown in Figure 1. Means whereby this is accomplished include a draw bar holding member 40 rigidly affixed to the underside of the front member 10 of leveler frame 2 midway between sides 14 of the leveler. The draw bar holding member depends downwardly from the frame and is provided with a pivot pin forming a clevis 42 at its lower end. The draw bar 8 is mounted on said pivot pin at a point (*b*) near its towing end for vertical pivotal movement relative to the pin. It will be noted however that to the extent either end of scraping element 4 is raised the draw bar must also turn. However, since a great degree of movement, i. e., wide angle movement, of either end of scraping element 4, when transmitted to draw bar 8 requires only a small degree of rotation by the draw bar, a convenient means for providing for the rotation of the draw bar is to have the hole at point (*b*) larger than the pivot pin. Draw bar 8 is also provided with a detachable wheel 9 to be described later.

As described the raising and lowering of either end of scraping element 4 is effected by operation of the hydraulic cylinders 30. The setting of the angle at which the scraping element is to be used, however, is accomplished by the adjustment of the length of cables 38*a* and 38*b*. Otherwise the ends of the scraping element would be free to move horizontally, unless instead carrying member 6 is secured to prevent its moving horizontally in either direction relative to its midpoint. Cables 38*a* and 38*b* desirably are wire cable but chains or other means can be used to maintain the angle of the scraping element.

The operation and utility of the land leveling device of the present invention is believed apparent from the foregoing description. Preparatory to operation the land leveler is pivotally connected to and supported by a tool bar of a land traction device, say by means of a pin or clamp. Next the scraping element angle is set. This angle is a manual operation and is set by lengthening one cable and shortening the opposite cable. The angle is set before the operation is started. During the leveling operation either end of the scraping element is raised or lowered by the operator as low places in the field are encountered, spilling dirt into such low places. The scraping element is made so it can be used straight for filling holes or at any angle required to roll the dirt. For example the scraping element can be set at an angle to roll dirt starting at the outer edge of a field and working to the center. As a result, the center will be higher than the outer edges allowing water to drain in all directions. The size of the machine will vary to fit the size of tractor that is to be used in pulling it. For example crawler type tractors having draw bar horse power ratings of from 90 to 225 can pull a leveler with a scraping element 40 feet long—smaller ones in proportion.

As previously indicated the land leveling device of this invention is characterized by its mechanical simplicity and reduced cost of construction. The frame for example can be manufactured from six inch "I" beams, while the scraping element 4 desirably will be a 14 inch "I" beam 40 feet long. Cables 38 which control the scraping element angle, in this instance, are five-eighths inch steel cable, while the draw bar 8 is for example a smaller beam, say a T beam. The 40 foot model very adequately fills holes eight to twelve feet in diameter and six to eighteen inches deep. In fact insofar as I have been able to determine there are no forty foot levelers now available. This is believed due to the fact that forty foot models cannot be transported down the highway. The land leveler of this invention can be readily dissembled for transportion. The scraping element and its carrying member are removed and the frame is towed. In accordance with one embodiment of this invention, however, a wheel 9 is provided. This wheel is detachable and is not used during operation. However for transporting the land leveler swivel wheel 9 can be attached, and the leveling device pulled sideways down the highway, by attaching cables to the frame or by raising the scraping element and pulling it. The detachable swivel wheel conveniently can slide into a pipe rigidly secured to the underside of the draw bar.

Although I have herein illustrated and described a form of an embodiment of my invention best known to me, it is to be understood that various changes in the apparatus can be made without departing from the spirit and scope of my invention. Thus, for instance, instead of using chain or wire cable to adjust the angle of the scraping element, pipe or various lengths can be employed. In addition the frame structure which supports the scraping element carrying member and hence the scraping element itself can be variously made. It can be not only trapezoidal as shown, but can be of any shape and size. Similarly while clevis attachments have been shown for the two flexible connections at 32 and 42 any connecting means such as ball joints can be used. Moreover instead of a beam as the scraping element a horizontal auger can be used, particularly for hard ground. Thus in some cases certain features of my invention will be used to advantage with certain other obvious modifications. For example a single wheel can be used at each end of the frame. Or if two wheels are used at each end of the frame, the pipe connecting the wheels to the frame can be between the two wheels. Other variations will occur to those using my land leveling device.

The invention claimed is:

1. In a land leveler having a soil-moving element whose leveling efficiency is dependent upon its attitude relative to the vertical and relative to its line of earth traversing movement and also dependent upon its elevation relative to terrain traversed, a supporting frame having a front member and a back member substantially parallel thereto, both rigidly attached at their ends to side members forming a quadrilateral leveler frame, said frame provided at the two opposite ends of its back member with downwardly depending swivel wheels which elevate the rear end of the supporting frame, said quadrilateral frame also being provided with a reinforcing brace connected to two opposite members thereof, a soil-moving element carrying member resting on top of the leveler frame and movably connected at its midpoint to the reinforcing brace for pivotal movement about said midpoint, a soil-moving element located beneath the frame, and carried by said pivotally movable carrying member, the soil-moving element being carried substantially in the same vertical plane as its carrying member, a hydraulic unit interposed at each end of the soil-moving element carrying member between the carrying member and the soil-moving element itself, each adapted separately to raise and lower its particular end of the soil-moving element, a draw bar adapted at one end for connection to towing means and having its opposite end pivoted to the soil-moving element at the midpoint thereof permitting horizontal pivotal movement of the soil-moving element relative to the draw bar, said horizontal pivotal movement being restricted in each direction by the wheels at the rear of the frame, a draw bar holding member attached to the front member of the leveler frame midway between the sides of the supporting frame and depending downwardly from the supporting frame, said downwardly depending member holding the draw bar at its end near the towing means connection and said draw bar being connected with said holding member for vertical pivotal movement of the draw bar relative to the downwardly depending member and for partial turning of said draw bar about its longitudinal axis and means for maintaining the soil-moving element at a desired angle relative to its direction of forward movement.

2. In a land leveler having a scraping element whose leveling efficiency is dependent upon its attitude relative to the vertical and relative to its line of earth traversing movement and also dependent upon its elevation relative to terrain traversed, a supporting frame having a front member and a back member substantially parallel thereto, both rigidly attached at their ends to side members to form a rigid substantially horizontal quadralateral leveler frame, downwardly dependent members rigidly attached to the two opposite ends of the frame back member to elevate the rear end of the leveler frame, wheels swivelly movable secured thereto, a center brace connected to the front and back members of the leveler frame and disposed midway between its side members, a scraping element carrying member resting on top of the leveler frame and movably connected at its midpoint to the center brace for pivotal movement about said midpoint, a scraping element of greater length than its carrying member and carried by said carrying member, the scraping element and the scraping element carrying member being so disposed that the midpoint of the scraping element is in vertical alignment with the midpoint of its carrying member whereby the two can be maintained in the same vertical plane as each pivots relative to its midpoint, a draw bar holding member rigidly affixed to the underside of the front member of the leveler frame midway between the sides of the leveler frame depending downwardly from the frame and provided with a pivot pin forming a clevis at its lower end; a draw bar having one end pivoted to the scraping element at its midpoint, adapted at its opposite end for attachment to a towing vehicle, and mounted on said pivot pin through a hole near said opposite end for vertical pivotal movement relative to the pin, said hole being slightly larger than said pin to permit the draw bar to rotate about its own axis to the extent that either end of the scraping element is raised, a hydraulic jack rigidly secured to the underside of the scraping element carrying member at each end thereof and operatively connected to the scraping element below, each adapted separately to raise and lower its particular end of the scraping element, two fluid conduits connected to each hydraulic jack and adapted for connection to a fluid source on a towing vehicle, hydraulic fluid control means disposed on said leveler frame for operation of the hydraulic jacks and an adjustable cable fastened near each end of the scraping element and to the draw bar, one capable of being shortened while the other is lengthened to hold the scraping element at an angle relative to its forward line of travel.

3. In a land leveler having a soil-moving element whose leveling efficiency is dependent upon its attitude relative to the vertical and relative to its line of earth traversing movement and also dependent upon its elevation relative to terrain traversed, a supporting frame having a front member and a back member substantially parallel thereto, both rigidly attached at their ends to side members forming a quadralateral leveler frame, said frame provided at the two opposite ends of its back member with downwardly depending swivel wheels which elevate the rear end of the supporting frame, said quadralateral frame also being provided with a reinforcing brace connected to two opposite members thereof, a soil-moving element carrying member resting on top of the leveler frame and movably connected at its midpoint to the reinforcing brace for pivotal movement about said midpoint, a soil-moving element located beneath the frame, and carried by said pivotally movable carrying member, the soil-moving element being carried substantially in the same vertical plane as its carrying member, a hydraulic unit interposed at each end of the soil-moving element carrying member between the carrying member and the soil-moving element itself, each adapted separately to raise and lower its particular end of the soil-moving element, a draw bar adapted at one end for connection to towing means and having its opposite end pivoted to the soil-moving element at the midpoint thereof permitting horizontal pivotal movement of the soil-moving element relative to the draw bar, said horizontal pivotal movement being restricted in each direction by the wheels at the rear of the frame, a draw bar holding member attached to the front member of the leveler frame midway between the sides of the supporting frame and depending downwardly from the supporting frame, said downwardly depending member holding the draw bar at its end near the towing means connection and said draw bar being connected with said holding member for vertical pivotal movement of the drawbar relative to the downwardly depending member and for partial turning of said draw bar, about its longitudinal axis means for maintaining the soil-moving element at a desired angle relative to its direction of forward movement, and means at the end of the draw bar near the holding member for attachment of a detachable third wheel permitting the land leveler to be pulled sideways.

References Cited in the file of this patent

UNITED STATES PATENTS

| | | |
|---|---|---|
| 198,880 | Fleming | Jan. 1, 1878 |
| 414,674 | Bronson | Nov. 12, 1889 |
| 1,736,575 | Bonnel | Nov. 19, 1929 |
| 2,090,776 | Arndt | Aug. 24, 1937 |
| 2,737,736 | MacDonald | Mar. 13, 1956 |